US008874360B2

(12) United States Patent
Klinger et al.

(10) Patent No.: US 8,874,360 B2
(45) Date of Patent: *Oct. 28, 2014

(54) AUTONOMOUS VEHICLE AND METHOD FOR COORDINATING THE PATHS OF MULTIPLE AUTONOMOUS VEHICLES

(71) Applicant: Proxy Technologies Inc., Reston, VA (US)

(72) Inventors: John Solomon Klinger, Washington Grove, MD (US); Robert F. Davis, Vienna, VA (US)

(73) Assignee: Proxy Technologies Inc., Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/724,414

(22) Filed: Dec. 21, 2012

(65) Prior Publication Data

US 2014/0081505 A1    Mar. 20, 2014

Related U.S. Application Data

(63) Continuation-in-part of application No. 13/417,046, filed on Mar. 9, 2012, now Pat. No. 8,788,121.

(51) Int. Cl.
*G05D 1/10* (2006.01)
*G08G 1/16* (2006.01)
*G08G 5/00* (2006.01)
*G08G 5/04* (2006.01)

(52) U.S. Cl.
CPC .............. *G05D 1/10* (2013.01); *G08G 1/162* (2013.01); *G08G 1/163* (2013.01); *G05D 1/104* (2013.01); *G08G 5/008* (2013.01); *G08G 5/0021* (2013.01); *G08G 5/0069* (2013.01); *G08G 5/045* (2013.01)

USPC ................ 701/301; 701/22; 701/25; 701/26; 701/414; 701/482

(58) Field of Classification Search
USPC ......................... 701/23, 25, 26, 301, 414, 482
See application file for complete search history.

(56) References Cited

U.S. PATENT DOCUMENTS 6,246,932 B1    6/2001  Kageyama et al.
6,292,725 B1    9/2001  Kageyama et al.

(Continued)

FOREIGN PATENT DOCUMENTS

CN          101122974 A    2/2008
KR   10-2008-0029679 A    4/2008

OTHER PUBLICATIONS

Office Action for U.S. Appl. No. 13/417,046, mailed May 29, 2013.

(Continued)

*Primary Examiner* — John Q Nguyen
*Assistant Examiner* — Michael Whalen

(57) ABSTRACT

A non-transitory processor-readable medium storing code causes a processor at a first vehicle (e.g., a first autonomous vehicle) to generate a first planned path based on a current position of the first vehicle and a mission requirement assigned to the first vehicle. A first planned path associated with a second vehicle (e.g., a second autonomous vehicle), which is based on a current position of the second vehicle and a mission requirement assigned to the second vehicle, is received at the first vehicle. After the first planned path associated with the second vehicle is received, a second planned path is generated based on the first planned path associated with the second vehicle and at least one of the mission requirement assigned to the first vehicle or the first planned path of the first vehicle. The second planned path of the first vehicle is transmitted to the second vehicle.

30 Claims, 13 Drawing Sheets

(56) References Cited

U.S. PATENT DOCUMENTS

| | | |
|---|---|---|
| 6,625,540 B2 | 9/2003 | Kageyama |
| 6,868,314 B1 | 3/2005 | Frink |
| 7,283,893 B2 | 10/2007 | Hara et al. |
| 7,343,222 B2 | 3/2008 | Solomon |
| 7,451,023 B2 | 11/2008 | Appleby et al. |
| 7,734,386 B2 | 6/2010 | DelNero et al. |
| 2003/0060942 A1 | 3/2003 | Kotzev et al. |
| 2003/0093187 A1 | 5/2003 | Walker |
| 2003/0191568 A1 | 10/2003 | Breed |
| 2004/0030448 A1 | 2/2004 | Solomon |
| 2005/0165516 A1 | 7/2005 | Haissig et al. |
| 2006/0095160 A1 | 5/2006 | Orita et al. |
| 2007/0057113 A1 | 3/2007 | Parks |
| 2008/0243305 A1 | 10/2008 | Lee et al. |
| 2009/0088916 A1 | 4/2009 | Elgersma et al. |
| 2009/0138151 A1 | 5/2009 | Smid et al. |
| 2010/0017046 A1 | 1/2010 | Cheung et al. |
| 2010/0042269 A1 | 2/2010 | Kokkeby et al. |
| 2010/0094499 A1 | 4/2010 | Anderson |
| 2010/0100269 A1 | 4/2010 | Ekhaguere et al. |
| 2010/0106356 A1 | 4/2010 | Trepagnier et al. |
| 2010/0114633 A1 | 5/2010 | Sislak et al. |
| 2010/0131121 A1 | 5/2010 | Gerlock |
| 2010/0163621 A1 | 7/2010 | Ben-Asher et al. |
| 2010/0256838 A1 | 10/2010 | Stecko et al. |
| 2010/0292871 A1 | 11/2010 | Schultz et al. |
| 2010/0324771 A1 | 12/2010 | Yabushita et al. |
| 2011/0082717 A1 | 4/2011 | Saad et al. |
| 2011/0112758 A1 | 5/2011 | D'Andrea et al. |
| 2011/0130954 A1 | 6/2011 | D'Andrea et al. |
| 2011/0135189 A1 | 6/2011 | Lee |
| 2011/0184604 A1 | 7/2011 | Franke et al. |

OTHER PUBLICATIONS

International Search Report and Written Opinion for International Application No. PCT/US13/29760, mailed May 13, 2013.
Office Action for U.S. Appl. No. 13/417,046, mailed Jun. 6, 2012.
Final Office Action for U.S. Appl. No. 13/417,046, mailed Nov. 7, 2012.
Office Action for U.S. Appl. No. 13/417,046, mailed Jan. 3, 2014.
Office Action for U.S. Appl. No. 13/417,046, mailed Aug. 20, 2013.

AUTONOMOUS VEHICLE AND METHOD FOR COORDINATING THE PATHS OF MULTIPLE AUTONOMOUS VEHICLES

CROSS-REFERENCE TO REPLATED APPLICATIONS

This application is a continuation-in-part of, and claims priority to, U.S. patent application Ser. No. 13/417,046, filed Mar. 9, 2012, entitled "Autonomous Vehicle and Method for Coordinating the Paths of Multiple Autonomous Vehicles," the disclosure of which is incorporated by reference herein in its entirety.

FIELD

Methods for coordinating cooperating autonomous vehicles are disclosed. These methods relate to an autonomous vehicle configured to cooperate with other autonomous vehicles in a network of autonomous vehicles.

BACKGROUND

As the use of autonomous vehicles such as unmanned aerial vehicles (UAVs), optionally piloted vehicles (OPVs), and robotic land, sea and space vehicles becomes prevalent, improved methods for coordinating their paths to allow them to cooperate in the performance of their specified tasks will be needed. Current methods for deconfliction and coordination of multiple vehicles require each vehicle to transmit its current position and velocity to the other vehicles in its area. Using this information, each vehicle can perform some limited functions for avoiding collision and coordinating their paths but cannot find optimal paths for achieving their goals via mutual cooperation.

SUMMARY

Disclosed methods permit autonomous vehicles to cooperate and execute their missions efficiently. These methods are applicable to any system in which multiple autonomous vehicles may need to coordinate their paths with each other. An operator, who is receiving communications from a vehicle, is also able to see what the vehicle is planning to do, giving him valuable insight into the expected behavior of the vehicle.

The vehicles are assumed to be a part of a network and able to communicate with each other. Further, at least some of the vehicles are able to independently make decisions as to how to behave based on their assigned missions and the information they receive. Specifically, the methods enable multiple vehicles to work cooperatively to coordinate their paths, and to accomplish their missions with a minimum of interference. Each vehicle can construct its own planned path and then can communicate that planned path to other vehicles in a network. In some embodiments, such a vehicle can construct a planned path using software executed by one or more processors on the vehicle.

The method is used autarchically by the individual vehicles in the network and does not depend on any single entity in the network to gather information and make decisions as to how to coordinate the vehicles. In other words, each vehicle can use the methods disclosed herein and operate independently from any other vehicle in the network. The network can be a dynamic network where any vehicle or ground station may enter or leave the network or lose contact with the network while the method is carried out.

In using the disclosed methods, one or more vehicles in the network prepares its own planned path. In some embodiments, the one or more vehicles include software (e.g., one or more computer programs) that is executed by one or more processors on the vehicle to prepare its own planned path. The vehicle communicates its planned path to other vehicles. The vehicle controls its movement to travel the planned path it has generated for itself to the best of the vehicle's abilities. As will be discussed in more detail below, the vehicle can prepare planned paths at various points in its mission.

The vehicles can, at certain times, generate a replanned path. The replanned path can be generated periodically or in response to any number of events. Events which can cause the vehicle to replan its path can include but are not limited to: the vehicle nearing the end of its current planned path, the vehicle receives a planned path from a cooperating vehicle, the vehicle detects a close encounter with another vehicle or with an object which is deemed to be too close, a vehicle or ground station joins the network, a vehicle or ground station loses contact with the network or loses contact with the network, the mission requirements change, certain mission requirements have been achieved, and a change in hierarchy or roles of the vehicles. A vehicle may receive a planned path from another participating vehicle and can, for example, modify its own planned path so as to avoid a collision or enhance cooperation with the other vehicles. Thus, the method enables the vehicles to consider the planned paths of the other cooperating vehicles in order to optimize their paths.

BRIEF DESCRIPTION OF THE DRAWINGS

The inventive methods will now be described with reference to the following drawings wherein.

DETAILED DESCRIPTION

Figure 1:
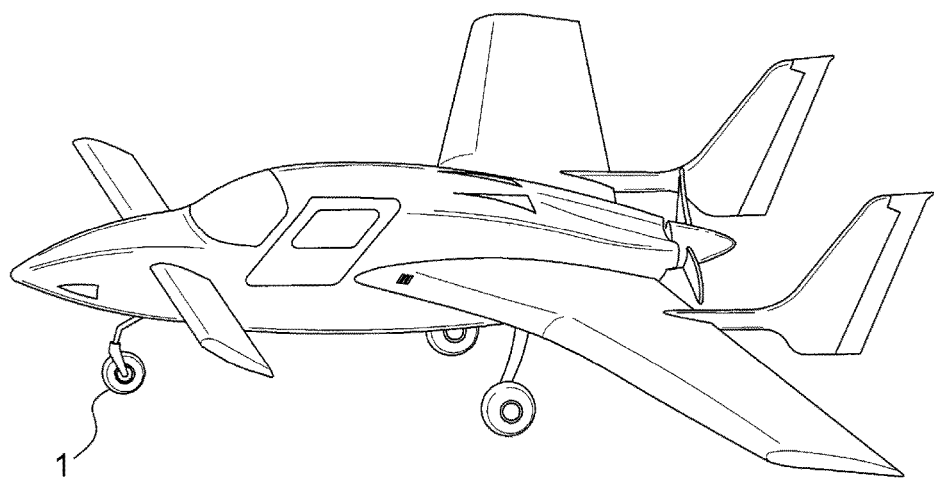
FIG. 1 shows an example embodiment of an autonomous vehicle as an unmanned aerial vehicle.

FIG. 1 shows an optionally piloted vehicle, which can be flown by a pilot or as an UAV, as an example for an autonomous vehicle 1. The vehicle 1 can, for example, also be a surface vehicle such as an all terrain vehicle, a boat, a tank and so forth or any other type of autonomous vehicle. A group of cooperating autonomous vehicles can also have vehicles of different types cooperate with each other.

Figure 15:
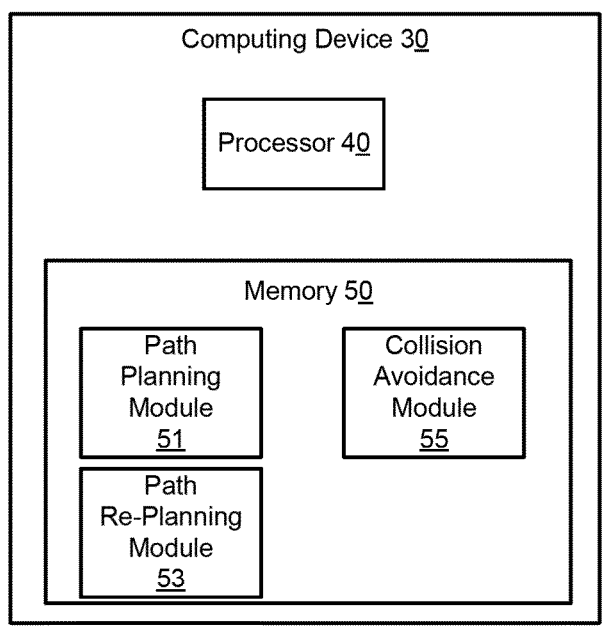
FIG. 15 is a schematic diagram of a control system of an autonomous vehicle.

In some embodiments, the vehicle 1 can include a computing device 30 having a memory 50 and a processor 40, as shown schematically in FIG. 15. The processor 40 can be any suitable processing device configured to run and/or execute software that is either stored on the vehicle or sent to the vehicle. For example, the processor 40 can be configured to plan a path and/or replan an already-planned path in response to receiving a signal from an external communication device or another vehicle, as described in further detail herein. More specifically, as described in further detail herein, the processor 40 can be configured to execute modules, functions and/or processes to plan a path and/or replan an already-planned path. In some embodiments, the processor 40 can be a general purpose processor, a Field Programmable Gate Array (FPGA), an Application Specific Integrated Circuit (ASIC), a Digital Signal Processor (DSP), and/or the like.

The memory 50 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 50 includes data used to generate a planned path for the vehicle and/or data used to determine whether the vehicle needs to replan an already-planned path. In such embodiments, for example, the vehicle is configured to add, remove, revise and/or edit data stored in the memory 50 based on a signal received from an external communication device and/or another vehicle using one or more communication modes. In some embodiments, the memory 50 stores instructions to cause the processor to execute modules, processes and/or functions associated with such path planning or replanning.

As shown in FIG. 15, the memory 50 can include a path planning module 51, a path re-planning module 53, and a collision avoidance module 55. The path planning module 51 is configured to generate a planned path for the vehicle in which the computing device 30 is located. The path planning module 51 can operate, for example, according to the method illustrated and described with respect to FIG. 2. The path re-planning module 53 is configured to generate a new planned path for the vehicle. As will be described in more detail herein, a new planned path may be needed when the vehicle, for some reason, is required to diverge from its current planned path and generate a new planned path. The path re-planning module 53 can operate, for example, according to the method illustrated and described with respect to FIG. 3. The collision avoidance module 55 is configured to detect or determine a "too close encounter". Such a "too close encounter" is described in more detail with respect to FIG. 5. The collision avoidance module 55 can operate, for example, according to the method illustrated and described with respect to FIG. 5.

Figure 12:
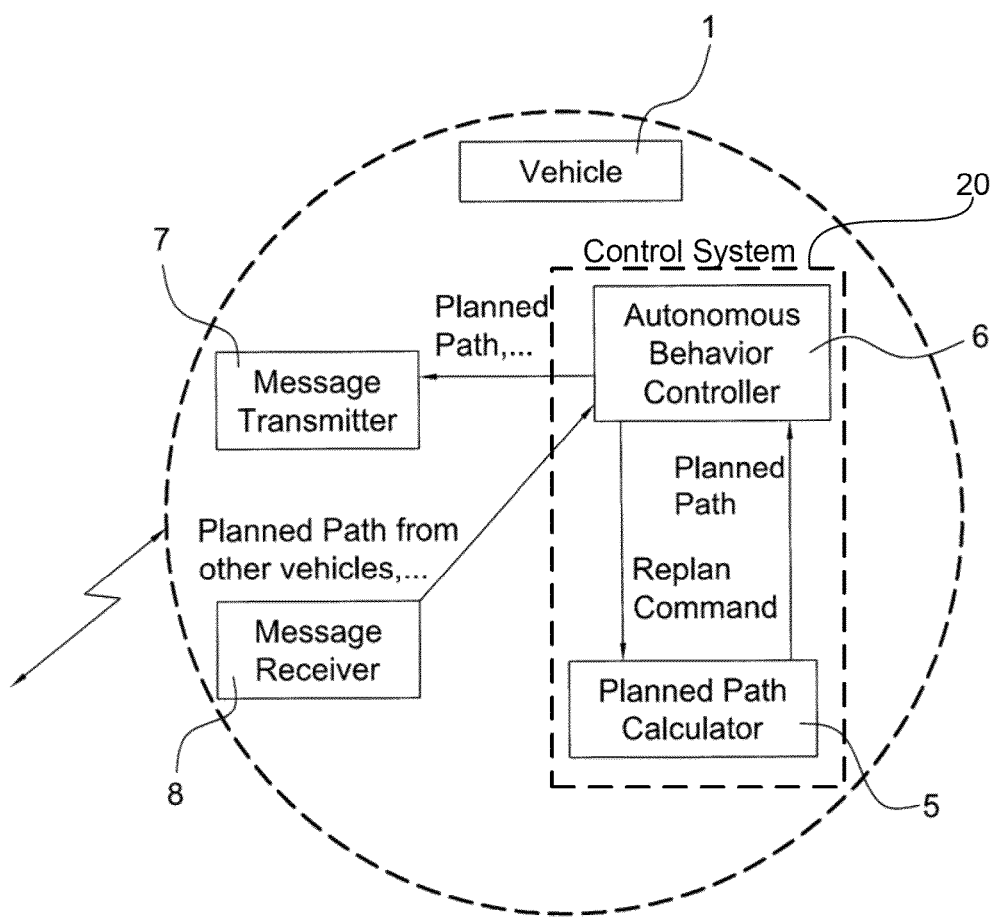
FIG. 12 is a block diagram showing components of an autonomous vehicle configured to cooperate with other autonomous vehicles; and, FIG. 13 shows a network of vehicles and control stations.

In some embodiments, the vehicle 1 can include one or more of the components illustrated and described with respect to FIG. 12.

Figure 2:
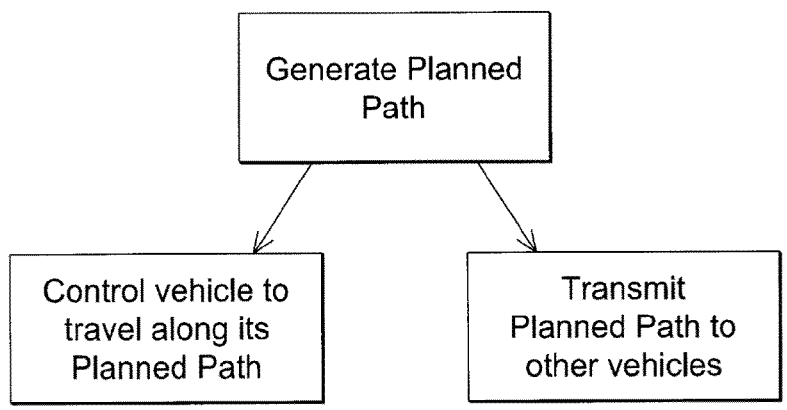
FIG. 2 is a flow chart showing the sequence of steps of a method for coordinating autonomous vehicles wherein each cooperating vehicle is provided with a set of mission requirements.

FIG. 2 is a flow chart which shows an example embodiment of a method by which each vehicle generates its own planned path. Such a planned path can be generated using, for example, software stored in a memory, and executed on a processor, on the vehicle. In order to generate its planned path, the vehicle may use any of a plurality of parameters or input. The parameters (or inputs) can be, for example, stored in a memory on the vehicle prior to operation and/or collected and stored by the vehicle while in operation. In embodiments where the vehicle has received planned path data from another cooperating vehicle, it can use that data as a parameter (or input) in generating its own planned path. Other examples of parameters (or inputs) include the current location of the vehicle, the velocity of the vehicle, the mission requirements provided to the vehicle, map or topographical data and/or the like.

As FIG. 2 shows, the vehicle can transmit its planned path data to other cooperating vehicles using any suitable communication method. Such communication methods can include radio communications based on any frequency spectrum (e.g., very high frequency (VHF) or ultra high frequency (UHF)) and any supporting infrastructure (e.g., satellites, cell phone towers, etc.). As will be discussed in more detail herein, a vehicle can transmit its planned path data to one or more other cooperating vehicles to enable each other vehicle to consider the planned path when it is generating its own planned path to, for example, enhance cooperation and avoid too close encounters or collisions. When the vehicle has autarchically generated its own planned path, the vehicle travels along the path to the best of its abilities. In other words, the vehicle follows the planned path generated for itself and operates independently of the other cooperating vehicles.

Figure 3:
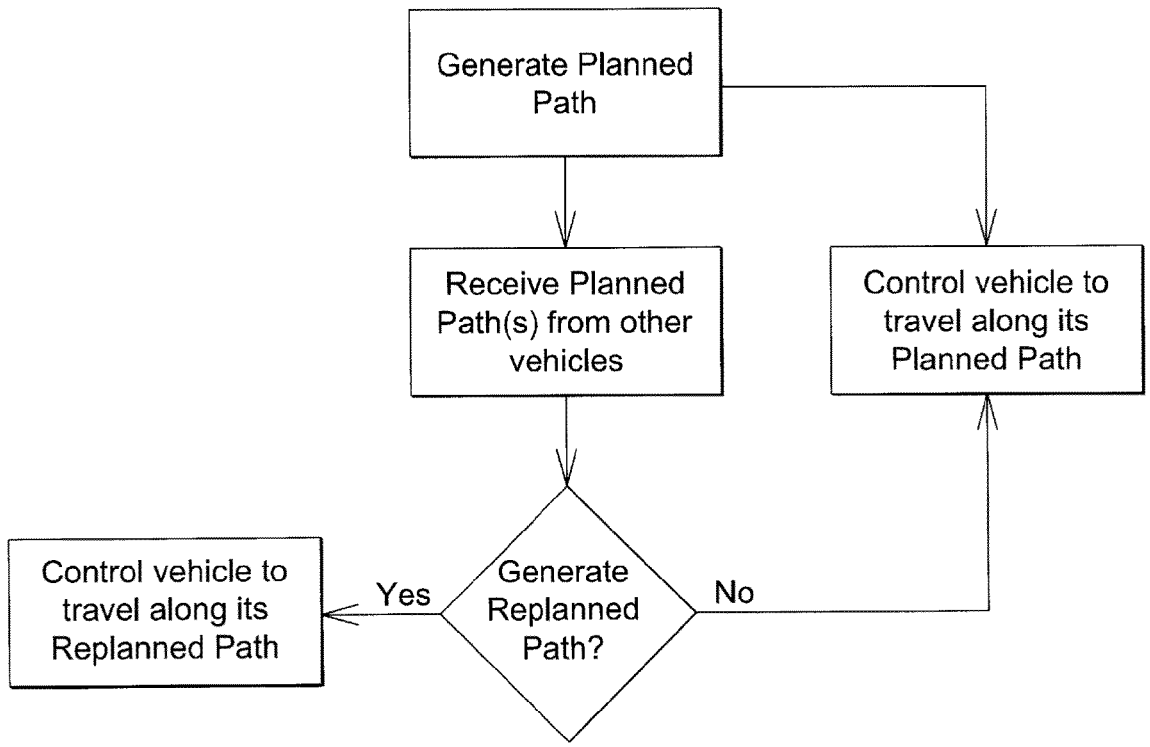
FIG. 3 is a flow chart showing the method of FIG. 2 wherein there is a return to the first method step in a selected one of the autonomous vehicles in response to replanning events.
Figure 4:
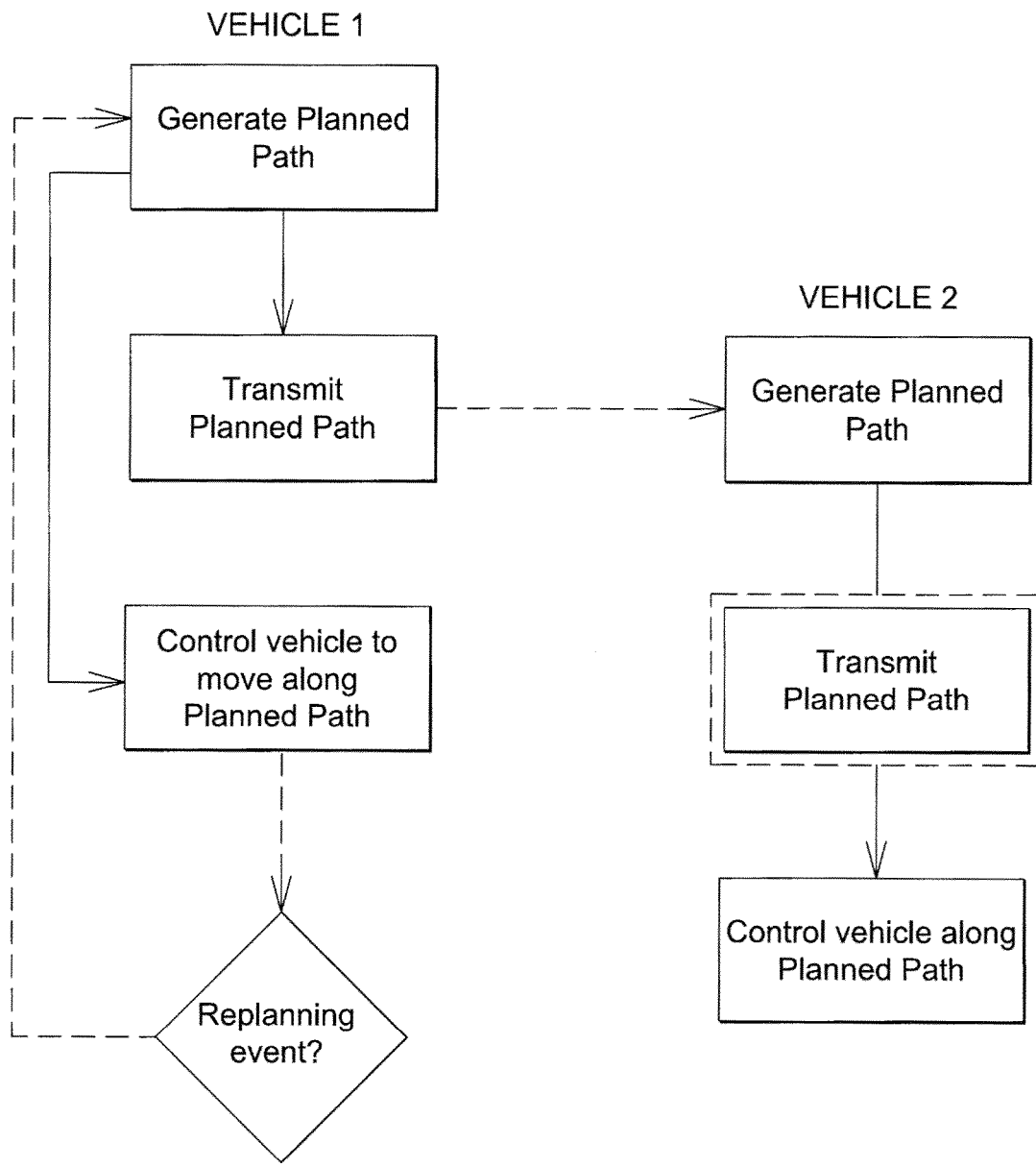
FIG. 4 is a flow chart showing the method as shown in FIG. 3 supplemented by specific replanning events.

As shown in FIG. 3, there may be events or situations where the vehicle would generate a new planned path. For example, wind, other environmental factors or equipment failure may cause the vehicle to depart from its planned path. Said another way, there may be events or situations where the vehicle is prevented from behaving as planned. In these situations, the vehicle may generate a new planned path or replanned path so as to more effectively accomplish the mission requirements and/or enhance cooperation between the cooperating vehicles. When the vehicle receives a planned path from another vehicle, that vehicle can, for example, in the interest of improving cooperation and/or more effectively and efficiently achieving the mission requirements, generate a new planned path in order to enhance cooperation. A further instance where it may be beneficial for the vehicle to recalculate its planned path is where there is a change in mission requirements or certain mission objectives have been accomplished or have become moot. Additional examples of events which may cause the vehicle to generate a new planned path are: the vehicle is close to the end of its current path, the vehicle detects a too close encounter or possible collision with another vehicle, the vehicle's teaming relationship with other cooperating vehicles in the network has changed, and where the vehicle is in a teaming relationship with other vehicles in the network where it is not the team leader and the team leader has generated a new planned path for itself.

Each vehicle can store data associated with its own planned path and/or data associated with the planned path reported by other vehicles in the network within a memory of the vehicle. Equipped with the knowledge of its own planned path and the planned path data reported by other vehicles in the network, each vehicle can determine whether a too close encounter will occur several minutes before the encounter. In some embodiments, each vehicle can store software or one or more computer programs configured to determine a "too close encounter". Such programs can be executed on one or more processors on the vehicle. In other embodiments, however, an external device can determine a "too close encounter" for a vehicle and then send data associated with the "too close encounter" results to the vehicle for processing and/or path replanning.

Figure 5:
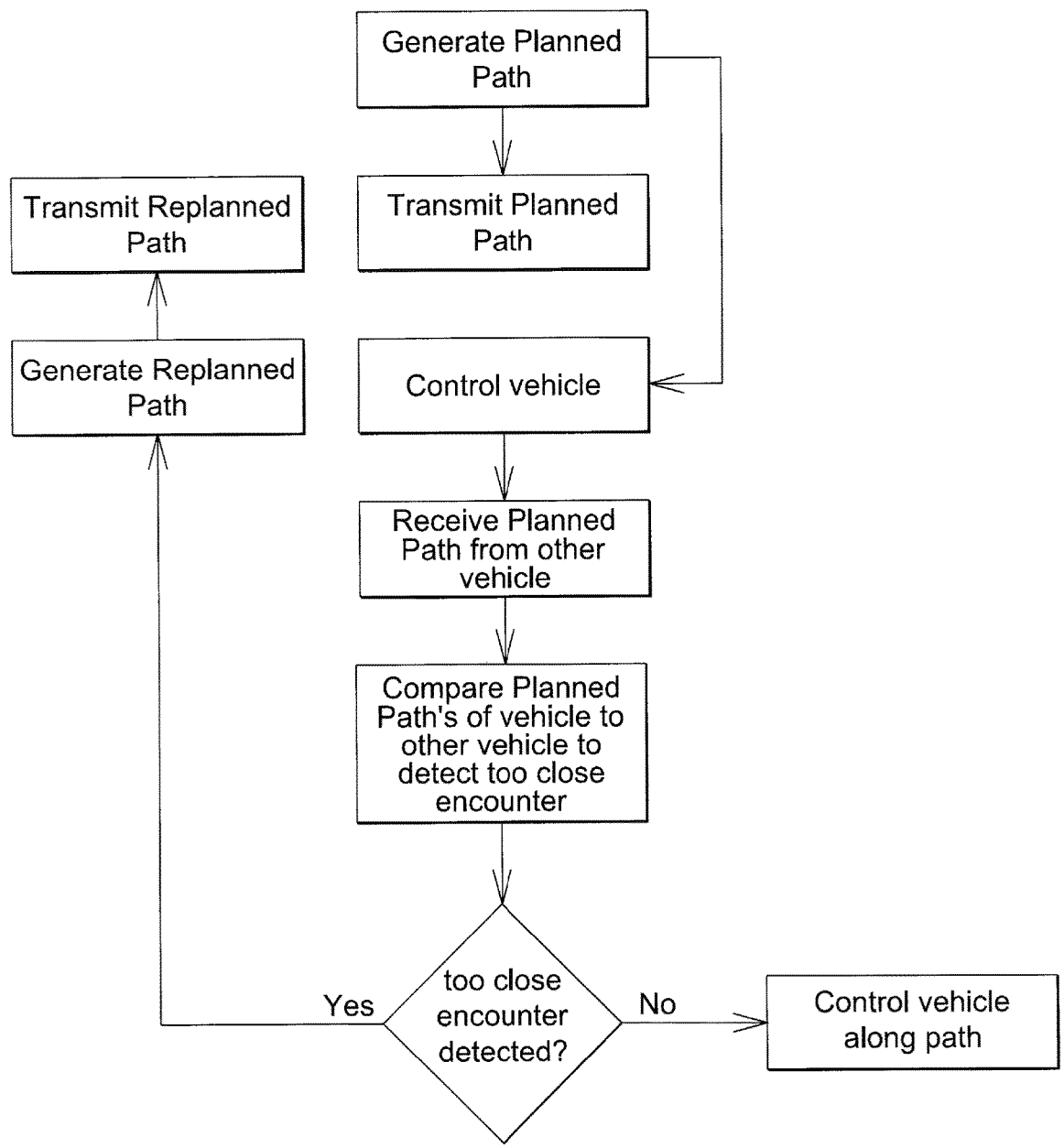
FIG. 5 is a flow chart showing the method of FIG. 2 wherein a too close encounter is detected.

As shown in FIG. 5, after generating its own planned path, a vehicle can, for example, compare its planned path to the planned paths of other vehicles in order to determine whether a too close encounter is going to or likely to occur. This can be completed in any suitable manner using, for example, a computer program stored at the vehicle and executed by one or more processors on the vehicle. If the vehicle does not detect a too close encounter, it will continue to travel along its planned path. If, on the other hand, a too close encounter is detected, a corrective action can be taken which is not disruptive to the missions of the vehicles involved. Only one vehicle may need to adjust its planned path and the automatic method can try different path adjustments to see if it succeeds in avoiding a collision with the other vehicle. The vehicle will make adjustments which are least disruptive to performing its current mission first. For example, a UAV might select from the following types of adjustments:

1. a temporary speed adjustment;
2. a temporary altitude adjustment; and,
3. an evasive horizontal profile adjustment that returns to the original planned path.

This does not necessarily replace emergency avoidance methods which command evasive actions when a collision in the near future is detected but this method can prevent such disruptive emergency avoidance actions from occurring. Emergency avoidance methods are generally used at the last minute to avoid a collision and may result in a temporary deviation from the planned path. Such emergency avoidance methods can include a climb or descent at a maximum rate and/or a right or left turn using a maximum roll angle choosing a direction that would best increase the separation distance between that vehicle and another vehicle with which that vehicle is about to collide. Each vehicle described herein is configured to perform emergency avoidance methods when and if needed.

In order to optimize cooperation between the vehicles, the planned path data includes sufficient data for a recipient of the planned path data to determine the expected future position of the vehicle that transmitted the planned path data at any given time within a specified time frame. The planned path data can be stored at the vehicle and used by one or more computer programs executed by a processor at the vehicle. As an example embodiment of the data, which enables the determination of the expected future position of, for example, a fixed wing aircraft which flies like a commercial aircraft, can include:

a. the absolute time at the start of the planned path;
    b. the flight time specified by the path;
    c. data to determine the speed profile of the path
        (i) an array of values of the horizontal component of the ground speed at an increasing sequence of times in the path. The first time is at the start of the path and the last time is at the end of the path. The value at any time in the path is the interpolated value at the surrounding data times specified. This data allows one to calculate the expected horizontal distance in the path at any time in the path.
    d. data to determine the altitude profile of the path.
        (i) the initial altitude of the path. (AMSL)
        (ii) the climb slope used for climb maneuvers.
        (iii) the descent slope used for descent maneuvers.
        (iv) an array of desired altitudes specified at an increasing set of horizontal distances in the path starting at 0.

The aircraft altitude at any horizontal distance into the path can be determined using the above data listed under subheading d ("data to determine the altitude profile of the path").

e. data to determine the horizontal (i.e. top view) profile of the path.
        (i) an array of horizontal path segments which can be arc segments or straight line segments which connect smoothly (i.e. each segment's end location and bearing is equal to the next, segment's start location and bearing). The arc segments are used to specify turns and are limited by a minimum allowed value for the planned turn radius based on the aircraft's expected ground speed and the maximum roll angle used for the aircraft.

The aircraft's horizontal location (i.e. its latitude and longitude) at any horizontal distance in the path can be determined using the above data listed under subheading e ("data to determine the horizontal (i.e. top view) profile of the path").

In some embodiments, the software implementing this methodology includes a data structure to represent the planned path for each of the planned path specifications for the types of vehicles in the system. These structures can have the data defined in the specification for that planned path type and the software can have various methods to support use of this data.

A sequence of waypoints, even where times of arrival at each waypoint is specified, would not provide sufficient information to define the planned path unless there was an understanding as to how to determine the position of the vehicle at any given time between the waypoints. For vehicles that are moving quickly, how the vehicle behaves as it changes direction should be specified since such vehicles cannot change direction abruptly and the resulting deviations from the point-to-point path cannot be ignored when such vehicles are attempting to act cooperatively. For example, each vehicle should specify its particular turn radius and when a turn should start for that particular vehicle for each turn required when traversing the waypoints. An aircraft, for example, travelling at 100 knots and having a limited roll of ±30 degrees will have a minimum turn radius of about 500 meters. A 180 degree turn for this aircraft will therefore take at least 30 seconds. The planned path for this aircraft will need to account for this turn radius and the time it will take to maneuver the aircraft in this manner. A sequence of waypoints would not account for the turn radius of a specific vehicle; the planned paths described herein, however, do take this information into account and, as a result, are more precise than a sequence of waypoints.

The vehicle generates its own planned path given its current location and velocity as well as the requirements of its mission. A control system on the vehicle can generate planned paths for various mission requirements. Such a control system can be control system 20 shown in FIG. 12. The control system can include, for example, one or more computer programs configured to generate planned paths for various mission requirements and/or one or more processors for executing such computer programs. In one embodiment, if the planned path information specification were described in the example data structure described above in relation to the example embodiment of a fixed wing aircraft, the control system (e.g., the planned path calculator module) would generate the horizontal profile of the planned path (e.g., the array of smoothly connected horizontal path segments), and the altitude and speed profiles of the planned path to meet the current mission requirements. A simple and common mission requirement for such an aircraft is to fly an orbit path around a target. Planned path segments which start at the aircraft's current location and bearing and then merge continuously into the orbit pattern would be generated. The turn segments in this ingress path would have a turn radius no smaller than a predetermined minimum value. Such a predetermined minimum value can be limited, for example, by the performance capabilities of the vehicle. The planning method generates an optimal set of path ingress segments that meet these specifications. In some embodiments, for example, the minimum turn radius for a vehicle can be determined based on a maximum expected ground speed during the turn and a maximum allowed roll angle. In some embodiments, a vehicle, such as an aircraft, has climb and descent rate limitations that are used when determining the various performance capabilities of the vehicle.

Figure 6:
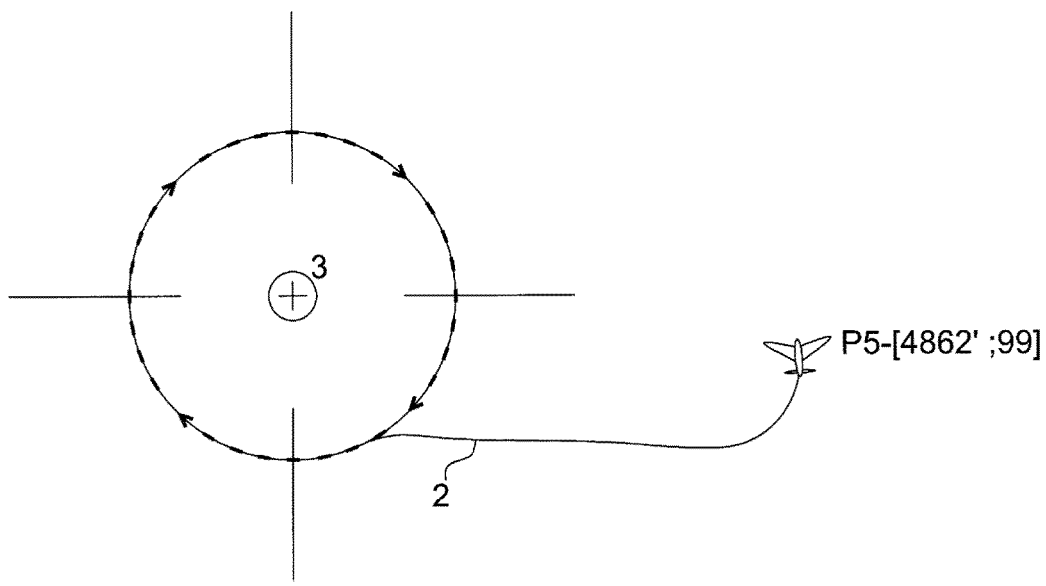
FIG. 6 shows a top view of a planned path for an aircraft orbiting a target.

FIG. 6 shows an example of a planned path 2 of the kind described by way of example above. FIG. 6 shows an aircraft with example altitude and velocity values whose mission requirements include orbiting an object 3. The top view shown in FIG. 6 illustrates the horizontal profile of an aircraft's planned path 2. Values for the current altitude (4,862 feet) and velocity (99 knots) for aircraft are also shown in FIG. 6 adjacent to the current location of the aircraft. The desired altitude and velocity values can be determined or calculated using, for example, an on-board computer program. In some embodiments, the current altitude and velocity values can be monitored by one or more individuals and/or computer programs located remotely from the aircraft.

Figure 7:
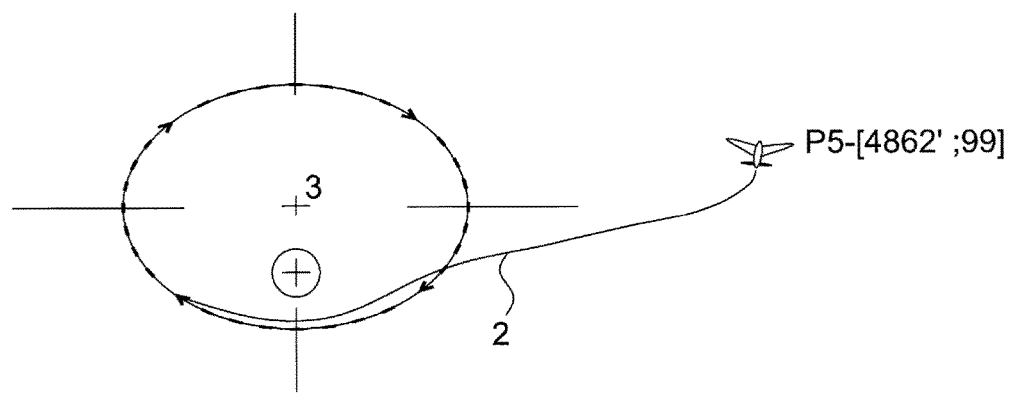
FIG. 7 shows an oblique view of a planned path for an aircraft orbiting a target where a descent is planned.

FIG. 7 shows an oblique view of a planned path 2 of an aircraft with example altitude and velocity values. The oblique view of FIG. 7 shows that the planned path 2 of the aircraft includes a descent and, thus, provides for an altitude profile in its planned path.

When a vehicle receives a planned path from another vehicle in the network, that vehicle can use the received planned path as a parameter (or input) to calculate its own path. The exchange of detailed planned path data between vehicles within a network enables the vehicles to cooperate more effectively. For example, when a vehicle receives a planned path update from another vehicle, that vehicle may decide to recalculate its own planned path to enhance cooperation with the vehicle that sent the planned path update as well as other vehicles in the network. Rules can be used to determine whether a vehicle needs to replan its planned path on the basis of the received planned path so as to avoid the possibility of this process repeating indefinitely. For example, the vehicles can be assigned different ranks in the network. In this case, a rule where a vehicle would not replan its path after receiving a new planned path from a lower ranked vehicle could be used. Such rules can be stored, for example, in a database held in a memory located on the vehicle. The rules can be pre-programmed in the vehicle or, alternatively, the rules can be created at a remote location while the vehicle is in operation and then sent to the vehicle during operation for use or storage.

The method provides significant advantages when working in conjunction with a mechanism for determining whether a vehicle is teaming with other vehicles while performing its mission. A team is defined as an ordered subset of the vehicles in the network where the first vehicle is the team leader. In the method according to an embodiment, the teaming mechanism would be a method that would allow each vehicle to determine whether it should be teaming with other vehicles and if so what its position or role in the team should be.

The teaming relationships as determined by each vehicle can change many times during its mission. Each vehicle can determine that it has entered or left a team based on what it is currently doing and based on the data it receives from other vehicles in the network. When such a teaming mechanism is present, there can be rules for determining planned paths for vehicles in a team. For a UAV, for example, this may mean following behind the leader at a given range based on its position in the team in an orbit path around a target but the details depend on the vehicles involved and the requirements of the mission. This permits planning of paths which facilitate more effective teaming with other vehicles since each vehicle receives the detailed planned paths from its other team members. Typically, the planning will evaluate a set of possible planned paths and select one that optimizes the way the path works together with the planned path of the leader based on the member's position in the team. As described herein, this planning and optimization can be accomplished using one or more on-board computer programs.

Figure 8:
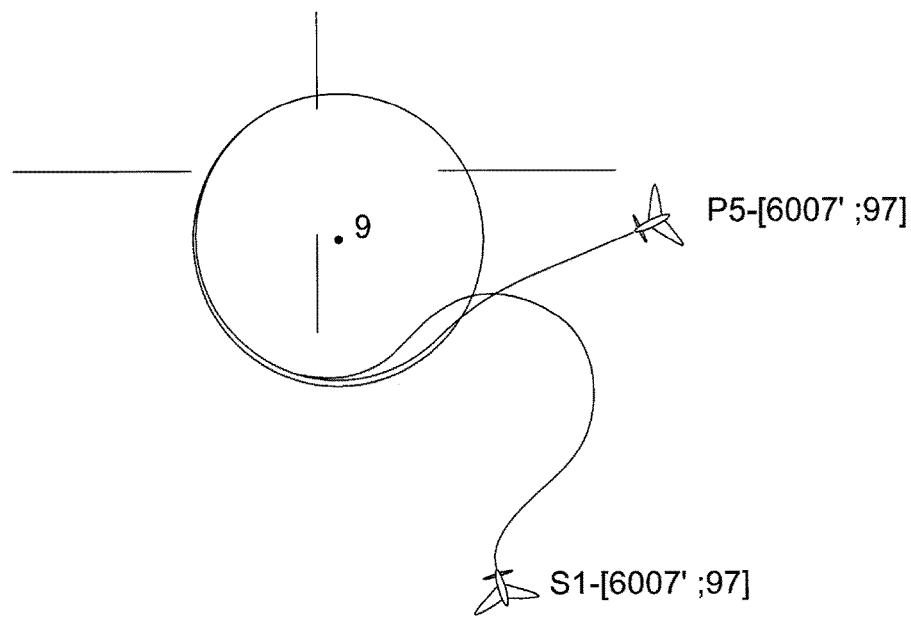
FIG. 8 shows the planned paths of two aircraft tasked with orbiting a target.
Figure 9:
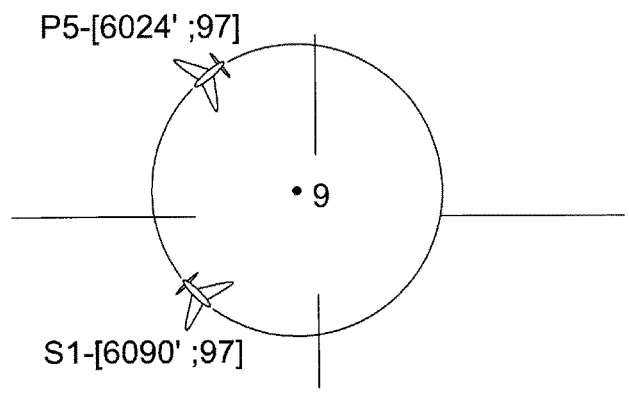
FIG. 9 shows the two aircraft of FIG. 8 on their orbiting path.

FIG. 8 shows an example of two aircraft cooperating in orbiting a target 9. In this example, the aircraft are trying to locate the position of a device near the target 9 that occasionally emits some radiation. The device can be, for example, a cellular telephone located at the ground level. Each aircraft has a sensor capable of detecting the radiation emitted from the device and determining the direction from which the radiation emanates. In some embodiments, the aircraft will generate the most precise device location information if they receive the signal from locations that are at directions from the device that differ by 90 degrees. In other words, as shown in FIGS. 8 and 9, aircraft 51 plans its path to fly behind the team leader P5 and to be 90 degrees behind team leader P5 on the target orbit circle. FIG. 9 shows the two aircraft after they are both in the specified orbit circle.

The method according to an embodiment can support a dynamic process. In the example according to FIGS. 8 and 9, if the target 9 location changes, the vehicles orbiting the target 9 could replan their paths and, when a team member receives a new planned path from its leader, that team member could replan again. In other words, the team member vehicle orbiting the target 9 can execute a computer program at any time to replan its path based on the new planned path of the leader vehicle.

Figure 10:
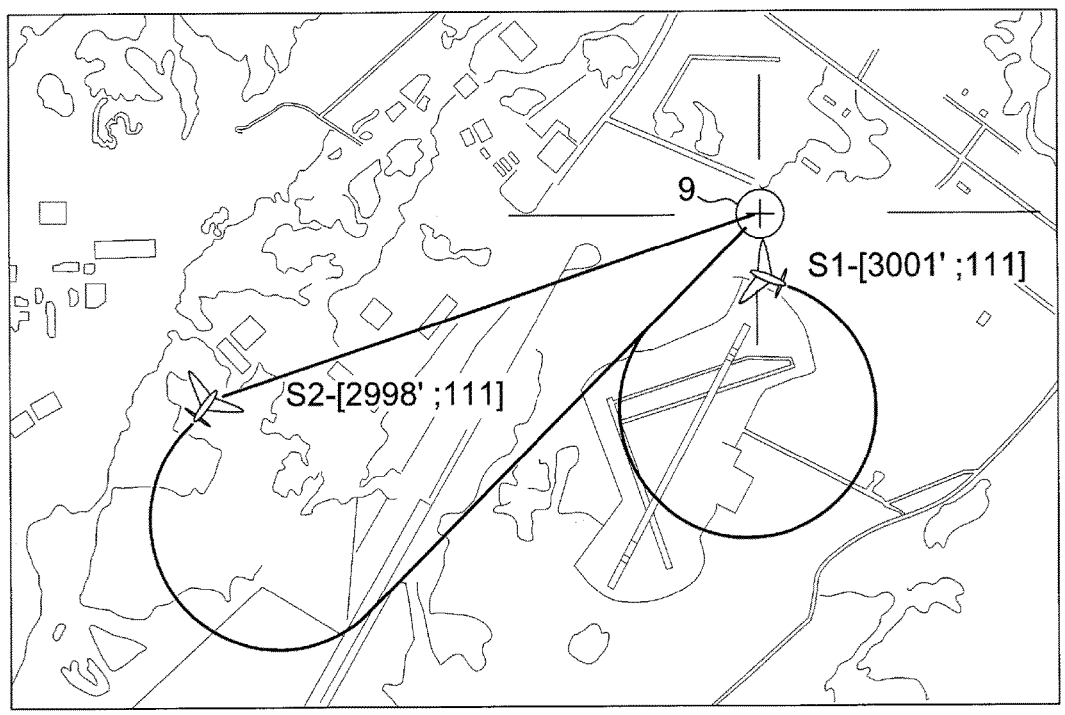
FIG. 10 shows two aircraft planning a cooperative attack profile on a target.
Figure 11:
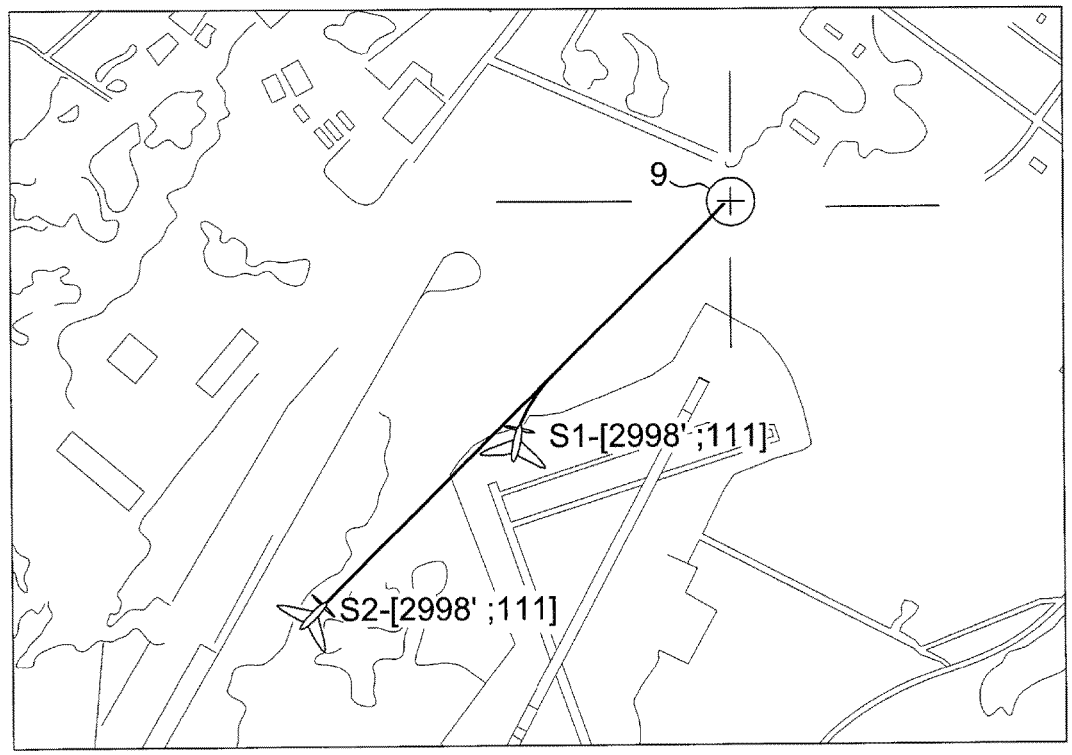
FIG. 11 shows the two aircraft of FIG. 10 in their proper position prior to weapon release.

FIG. 10 shows an example of two aircraft cooperating to attack a target 9. Aircraft S2 is tasked to provide laser designation for a weapon to be released by aircraft S1. In this example, aircraft S1 plans its attack profile and aircraft S2 uses a "cooperative flight" method to calculate its "planned path" based on the "planned path" data that it receives from S1. This method finds an optimal path that puts S2 in the proper position to perform its task at the time of release of the weapon. This method can be executed, for example, via an on-board computer program. In FIG. 11, the two aircraft have reached their proper positions prior to release of the weapon. S1 receives the planned path data from S2 but as the team leader, S1 would not replan its path whenever it receives a new planned path from S2. But S1 would use the planned path data it receives from S2 in order to decide whether it can leave a pre-attack hold pattern and start the attack profile, and at the time of weapon release, whether S2 is in position and S1 can release its weapon. This decision-making can be accomplished, for example, using one or more on-board computer programs. In other embodiments, however, the aircraft S1 can receive a signal from a remote location that instructs the aircraft S1 as to whether it can leave the pre-attack hold pattern, start the attack profile, and/or release its weapon.

The vehicles described herein can include one or more of the components illustrated and described in FIG. 12. For example, FIG. 12 shows the components of a vehicle 1 configured to cooperate with other vehicles in a network. The vehicle 1 includes a message transmitter 7, a message receiver 8, and a control system 20 having an Autonomous Behavior Controller (ABC) and a planned path calculator 5. In some embodiments, the vehicle 1 includes a device (not shown) to determine the current location, such as, for example, a global positioning system (GPS) or other like device. The message receiver 8 is configured to receive planned path data from other vehicles. The message receiver 8 can be any suitable electronic device configured to receive electromagnetic (EM) signals, e.g., representing planned path data, from one or more other vehicles and/or a control station. The message receiver 8 is configured to send the received data/signals to the control system 20 for processing. In some embodiments, the message receiver 8 can be a transceiver module configured to receive EM signals as well as transmit EM signals. For example, in some embodiments, the message receiver 8 can receive the vehicle's own planned path from the control system 20 and broadcast that planned path to the network such that the other vehicles in the network receive that vehicles planned path.

The planned path data can be received, via the message receiver 8, in any suitable form, such as, for example, in a serialized stream of bytes. In some embodiments, the planned path data can be received, via the message receiver 8, in an encrypted format. In some such embodiments, the message receiver 8, or another component of the vehicle 1, can include software configured to decrypt the encrypted planned path data. In some embodiments, the message receiver 8 includes software configured to deserialize the planned path data byte streams into the planned path data structures that they represent. In some embodiments, the message receiver 8 includes software configured to check that the received planned path data is consistent with other data received from that same vehicle. Such software can flag an error condition if the vehicle from which data was received is not on its path. Such software can also find the other vehicle's current position in its path.

The planned path calculator 5 is configured to generate a planned path for the vehicle 1. The planned path calculator 5 is illustrated in FIG. 12 as being a component or module of the control system 20. In other embodiments, however, the planned path calculator 5 is separate from the control system 20. The planned path calculator 5 can include one or more computer programs configured to perform the calculations necessary to generate such a planned path for the vehicle 1. The generated planned path of the vehicle 1 can be based on any number of parameters. These parameters include but are not limited to the current location of the vehicle 1, the requirements of the mission provided to the vehicle 1, current speed of the vehicle 1, environmental factors, and planned path data received from other vehicles. In some embodiments, one or more of the parameters can be stored on a memory of the vehicle 1 and/or collected by the vehicle 1 while is in operation.

The message transmitter 7 is configured to transmit the planned path that the vehicle 1 has autarchically generated for itself to other vehicles in the network. The message transmitter 7 can be any suitable electronic device configured to transmit EM signals, e.g., representing the vehicle's planned path data, to one or more vehicles and/or a control station in the network. The message transmitter 7 is configured to receive such data from the control system 20. In some embodiments, the message transmitter 7 can be a transceiver module configured to transmit EM signals as well as receive EM signals. For example, in some embodiments, the message receiver 8 can receive planned path data from one or more vehicles in the network.

The planned path data transmitted by the message transmitter 7 can be transmitted in any suitable form. For example, in some embodiments, the message transmitter 7 serializes the planned path data into a stream of bytes and sends that stream to the other vehicles in the network. In some embodiments, the planned path data is transmitted by the message transmitter 7 in an encrypted format. In some such embodiments, the message transmitter 7, or another component of the vehicle 1, includes software configured to encrypt the planned path data. Although the message receiver 8 and the message transmitter 7 are illustrated and described in FIG. 12 as being two separate components, in other embodiments, the vehicle 1 can include a single component (e.g., a transceiver module or device) that is configured to both send and receive messages and data.

The autonomous behavior controller 6 is configured to control the vehicle 1 so that the vehicle 1 follows the planned path it has generated for itself. For example, the controller 6 can be configured to maintain the vehicle 1 at a specific velocity or altitude specified by the planned path. The controller 6 can, for example, determine and apply any control commands needed to keep the vehicle on its planned path. Additionally, the controller 6 can flag a replanning event and/or an error condition if the vehicle is off its planned path. In some embodiments, the controller 6 repetitively performs the functions described herein at a rate based on the specific control requirements of the vehicle. For example, the controller 6 can be configured to perform any of the described functions in 0.1 second intervals, in 0.5 second intervals, in 2 second intervals or any other suitable interval.

The controller 6 can include one or more of the memories and/or processors described herein. Thus, the controller 6 can be configured to execute one or more computer programs on the vehicle to perform one or more of the various functions described herein.

In some embodiments, the planned path calculator 5 may periodically generate a new planned path for the vehicle or generate a new or replanned path in response to certain events. These events include but are not limited to receiving a planned path from another vehicle, vehicle 1 is nearing the end of its current planned path, vehicle 1 has deviated from its planned path, there is a change in mission requirements, certain mission objectives have been accomplished, a new cooperating vehicle joins the network, a cooperating vehicle leaves the network, another cooperating vehicle is impaired in its ability to perform the mission, and vehicle 1 detects an encounter with another vehicle or object which is too close. In some embodiments, the planned path calculator 5 is stored and/or executed by the controller 6.

Figure 13:
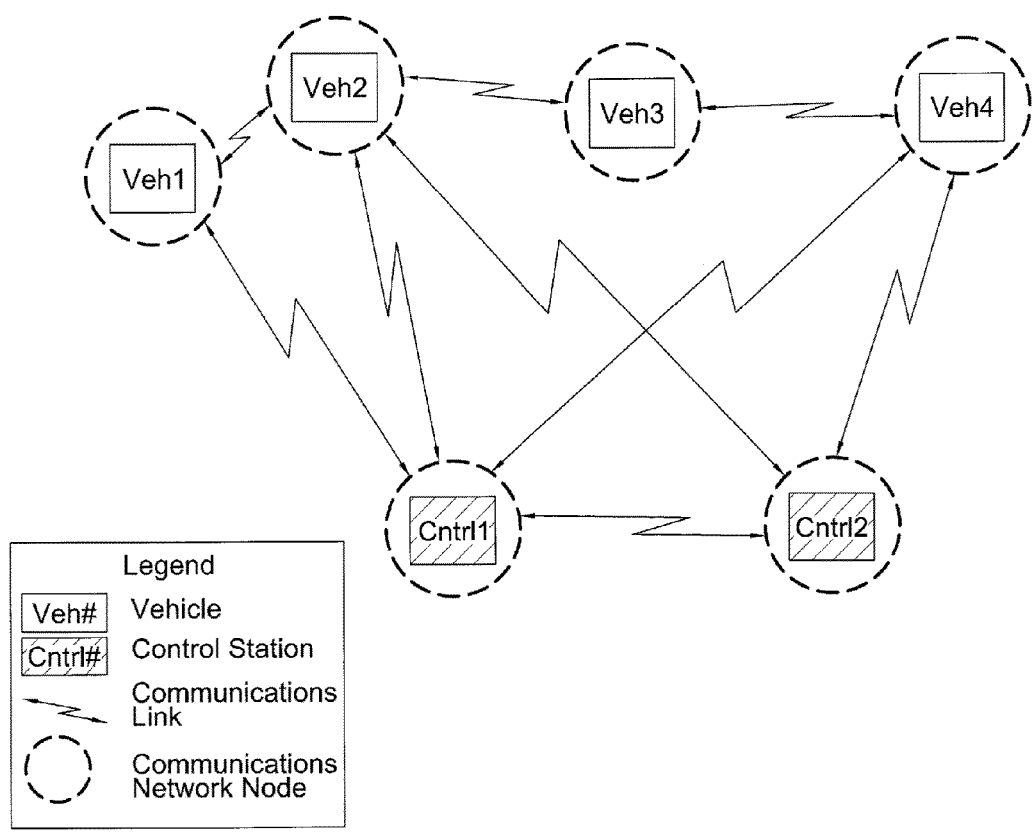

FIG. 13 shows an example embodiment of a network which contains both vehicles and control stations participating in the network. FIG. 13 shows the communications network nodes of the participants and communications links between the participants.

Figure 14:
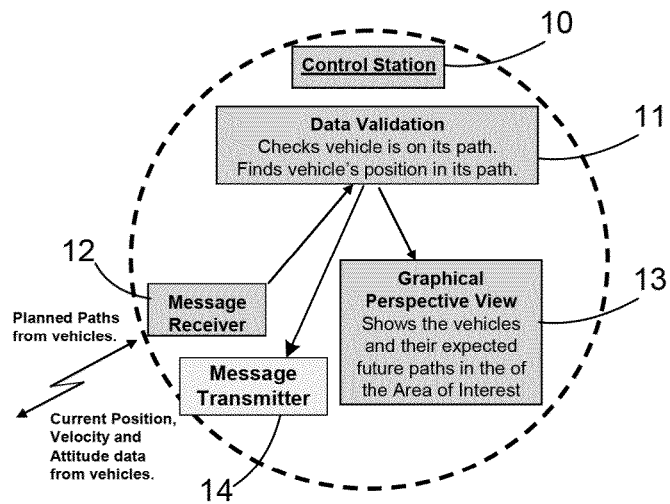
FIG. 14 is a block diagram showing components of a control station configured to communicate with one or more autonomous vehicles.

FIG. 14 shows the system components on a control station 10 (e.g., control station "Cntrl1" or "Cntrl2" shown in FIG. 13). The control station 10 is configured to communicate with one or more vehicles in a network and to receive the planned paths and other state data transmitted from these vehicles. The control station 10 includes a message receiver 12 configured to receive these planned paths and state data, and a message transmitter 14 configured to transmit communication signals to the vehicles within the network. In some embodiments, the message receiver 12 can operate and function similar to the message receiver 8 shown in FIG. 12. In some embodiments, the message transmitter 14 can operate and function similar to the message transmitter 7 shown in FIG. 12. Although the message receiver 12 and the message transmitter 14 are illustrated and described in FIG. 14 as being two separate components, in other embodiments, the control station 10 can include a single component (e.g., a transceiver module or device) that is configured to both send and receive messages and data.

As shown in FIG. 14, the data received at the message receiver 12 is sent to a data validation module 11 within the control station 10. The data validation module 11 is configured to monitor each vehicle and determine whether a particular vehicle is maintaining course on its planned path. The data validation module 11 is also configured to determine the vehicle's position on its planned path. In some embodiments, the data validation module 11 determines the vehicle's position on its planned path only when the vehicle is determined to be on that planned path.

The control station 10 can also include a graphical perspective view generating module 13. The graphical perspective view generating module 13 can be, for example, software to generate a graphical user interface displayed on a media viewing device (e.g., a computer monitor or the like). An individual located at the control station 10 can monitor each of the vehicles in a network using the graphical user interface. In some embodiments, the graphical perspective view generating module 13 shows the expected future paths of each of the vehicles. In some embodiments, when the control station 10 has not received navigation data from a particular vehicle after a predetermined elapsed time, the control station 10 is configured to use the last planned path data received from the vehicle to estimate the current location of the vehicle along the planned path.

The control station 10 can be located any distance from the vehicles that the control station 10 is monitoring (subject to the availability of a suitable communication link). For example, the control station 10 can be located in Arizona and the vehicles which the control station 10 is monitoring can be located in Iraq. In this manner, the control station 10 can monitor, communicate with and/or control these unmanned vehicles from any location around the world.

The method according to an embodiment may be practiced in an environment where the communications between the vehicles may be spotty and there may be a limited bandwidth for these communications. Based on these limitations, a rule can be implemented which defines if a vehicle's planned path data would need to be retransmitted to other cooperating vehicles. For example, a vehicle could retransmit its planned path data at regular intervals to compensate for the possibility that the original message was lost. In some embodiments, software stored on the vehicle can be configured to respond to a set of retransmission events that would prompt a vehicle to retransmit its planned path to the other vehicles in the network. These retransmissions can occur, for example, after the initial transmission that is sent whenever the vehicle changes its planned path. In some embodiments, a typical transmission event occurs when a specified time interval has elapsed since the last transmission of the planned path.

The disclosed methods and vehicles are useful in any scenario where multiple autonomous vehicles are tasked with cooperating in order to accomplish a mission. Some examples of actions where the disclosed methods and vehicles can be used are:

Vehicles working together to locate a target or search an area or road.
 A vehicle tasked to support another vehicle in its mission:
  Provide laser designation for an attack mission.
  Provide jamming or other countermeasure for another vehicle.
  Provide a communications link for another vehicle.
 A UAV tasked to support a ground vehicle:
  Provide air support for a convoy.
  Provide intelligence for a ground vehicle.
  Provide a communications link for a ground vehicle.
 A UAV tasked to support a sea vehicle:
  Provide intelligence for a sea vehicle.
  Provide a communications link for a sea vehicle.

The objects in a network of vehicles and control stations, as described above, are defined as "Participants". This methodology applies to the following types of participants:

a. Moving fully autonomously—entirely self directed
 b. Moving partially autonomously—
  Self directed with some human input
  Self directed after inputting an initial movement plan
  Any combination of the above. Self directed with some human input that may be in the form of general movement plan. Self directed after inputting an initial movement plan and then with some human input that changes the plan by cancelling it, modifying it, or replacing it with another movement plan.
 c. Moving under human control
 d. Not moving The method according to an embodiment can apply to participants that may vary their status over time. That is, for example, a participant can be moving fully autonomously for some period of time and then be moving fully under human control for another period time. Similarly, a participant may be moving for some period of time and then not moving for another period of time. In general, this methodology applies to a group of participants, each of which may at any time change their status between any of those listed above.

The method according to an embodiment applies to broad sets of operational scenarios of participants cooperatively coordinating their movements. Three examples of categories of scenarios and the desired goals (sensor utilization, weapon utilization, and safety) that the method according to an embodiment can be applied to are described below. This can also be applied to any combination of scenario categories.

a. Sensor Utilization

Sensor data is any data that in some way provides information about an environment (e.g. picture images). Sensor data can be data provided directly from a sensor or data from one or more sensors that has been processed by a "sensor data processor" into a more refined and/or useful form.

The sources of sensor data can be any one or more of the following:

(i) One or more sensors that are part of a cooperating vehicle, either attached or an integral part of the participant.
 (ii) One or more sensors that are external to a participant, either a part of another participant or completely separate from any of the participants.
 (iii) One or more sensor data processors that are part of a participant, either attached or an integral part of the participant.

(iv) One or more sensor data processors that are external to a participant, either a part of another participant or completely separate from any of the participants.

There are many cases of sensor utilization for which the disclosed methods can be applied. Below are just two examples:

Using multiple sensors on different cooperating participants to more quickly and accurately triangulate the location a signal source.

Using multiple sensors on different cooperating participants to view something more effectively by simultaneously observing from different view points.

b. Weapon Utilization

A weapon can be part of a participant, either attached or an integral part of the participant. A weapon can also be external to a participant, either a part of another participant or completely separate from any of the cooperating vehicles.

There are many cases of weapon utilization in which the above claim applies. Below are just two examples:

Having one cooperating participant deliver a laser guided weapon where the target is being designated by the same cooperating participant, another cooperating participant, or by something external to the participant group.

Two or more cooperating participants coordinate the delivery of multiple weapons in some fashion (e.g. by time of delivery, by direction of delivery, by location of delivery, etc.).

c. Safety

The disclosed methods can also be applied to systems that enhance the safety of operation of participants. Safety of operation means the safe operation of the participant so that the chances of its operation causing damage or injury are reduced or eliminated. Safety of operation also means the safe operation of things external to the vehicle implementing a disclosed method so that the chances of their operation causing damage or injury are reduced or eliminated.

There are many cases of safety improvement in which the above applies. Below are just two examples:

Using the planned path of an unmanned participant, a manned participant can steer his participant to avoid the unmanned participant.

Sharing planned paths between two different autonomous cooperating participants, each participant's autonomous control can ensure that each participant can avoid the other.

Figure 18:
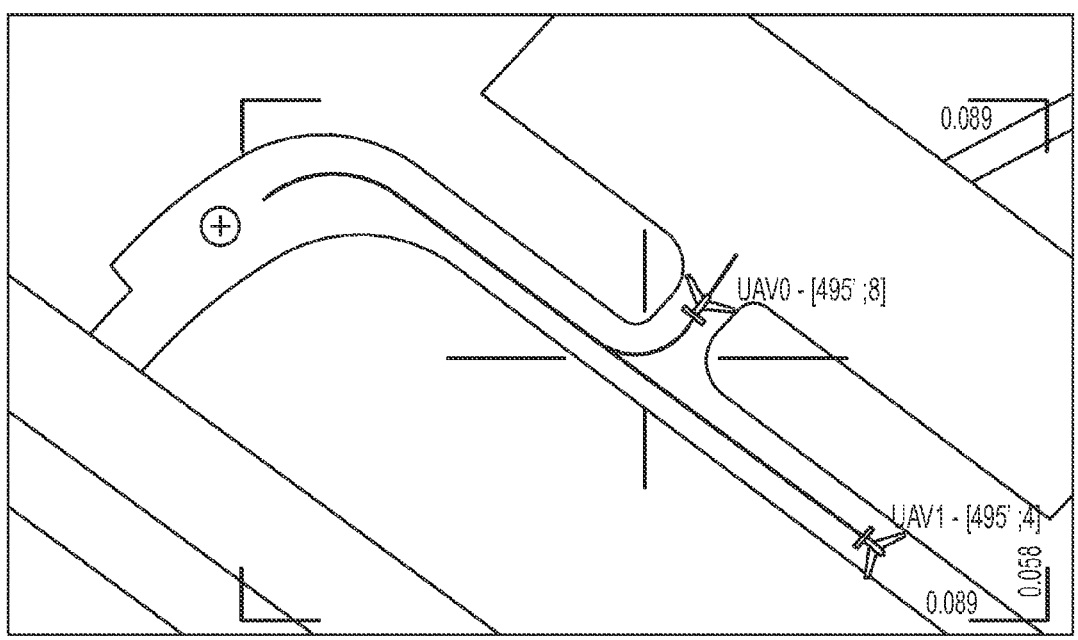
FIG. 18 is a graphical illustration of a taxi system according to an embodiment.

Sharing planned paths for collision avoidance can be particularly useful for ground taxiing vehicles. For example, in some embodiments, the disclosed methods can be used by aircraft and ground vehicles at busy airports to improve safety and airport efficiency while taxiing. When unmanned vehicles are used at airports, those unmanned vehicles must not interfere with manned aircraft operations. Currently, unmanned air vehicles that use airfields are controlled manually by a ground pilot while taxiing prior to takeoff and after landing. This method would be useful as a part of a system in which the movement of the unmanned vehicles or manned vehicles was controlled autonomously while taxiing. In such a system, the manned vehicles and the air traffic controllers can receive the planned paths of unmanned vehicles in their vicinity and automatically determine if those planned paths conflict with their planned path. The manned vehicle(s) and/or the air traffic controller(s) can also determine quickly when an unmanned vehicle or a manned vehicle is malfunctioning based on whether that unmanned or manned vehicle is deviating from its planned path. Other autonomous taxiing vehicles using this method can, in some embodiments, automatically replan their planned taxi paths to coordinate with the planned taxi paths received from other vehicles in the vicinity. FIG. 18, for example, shows an unmanned vehicle UAV1 that has slowed down his taxiing speed to 4 knots to allow sufficient separation from the planned path it received from unmanned vehicle UAV0.

The unmanned vehicles in this taxiing example can operate and function in the same manner as any of the vehicles illustrated and described herein. For example, the unmanned taxiing vehicles can generate a planned path in any manner described herein and can communicate with any other vehicle in any manner described herein. Similarly, the manned vehicles in this taxiing example can operate and function in the same manner as any of the unmanned vehicles illustrated and described herein. In some embodiments, the taxiing system can accommodate any number of cooperating manned or unmanned vehicles. For example, in some embodiments, the taxiing system can include up to 32 cooperating manned or unmanned vehicles.

Method for Control of an Aircraft for Persistent Surveillance of a Target

Another useful method relates to control of an aircraft, such as a fixed wing aircraft, with a wide field of view and fixed orientation sensor, such as an image sensor, so that the aircraft can provide persistent surveillance of a target on the ground in windy conditions. In some embodiments, the sensor is mounted perpendicular (or substantially perpendicular) to the body axis of the aircraft and/or at some fixed depression angle relative to the horizontal plane of the aircraft. In other embodiments, however, the sensor can be mounted at any suitable location on the aircraft with respect to the body axis.

In some such embodiments, if wind speeds are significant, a circular planned path does not provide a sufficient view for surveillance. Thus, in some embodiments, the aircraft includes software configured to adapt to these windy conditions and improve surveillance when an aircraft is orbiting a target. Specifically, the software is configured to control the aircraft by maintaining the aircraft at a fixed speed and altitude, while regularly adjusting the roll angle of the aircraft to keep the target close to the center of the view. The result of this control is an orbit that is substantially elliptical in shape (as opposed to circular).

In some embodiments, a control method for an aircraft can assume that (a) the flight can be controlled by regularly commanding an air speed, an altitude and a roll angle for the aircraft and that (b) the aircraft uses coordinated flight (no side slip) when responding to these commands. The control method can be based on the analysis of a constant wind situation in which the aircraft flies at a constant True Air Speed (TAS) and altitude around a target and just modifies its roll angle to keep its heading (the direction of its body axis) perpendicular to the direction to the target. This analysis shows that:

The resulting flight path returns to the same location after an orbit around the target.

The path is an ellipse with the target located at one of its foci.

The eccentricity of this ellipse is the wind's speed divided by the true air speed of the aircraft and the major axis of the ellipse is perpendicular to the wind direction.

In the no wind situation, there is a circular path around the target with a radius that corresponds to an aircraft roll angle that centers the sensor exactly on the target for the entire orbit.

In the high wind situation (i.e. wind speeds greater than 20% of the aircraft's TAS), there is no path that puts the target at the center of the sensor for the entire orbit but there is an optimal elliptical path that keeps the sensor pointed closer to the target than any circular path would be for that wind speed.

Figure 16:
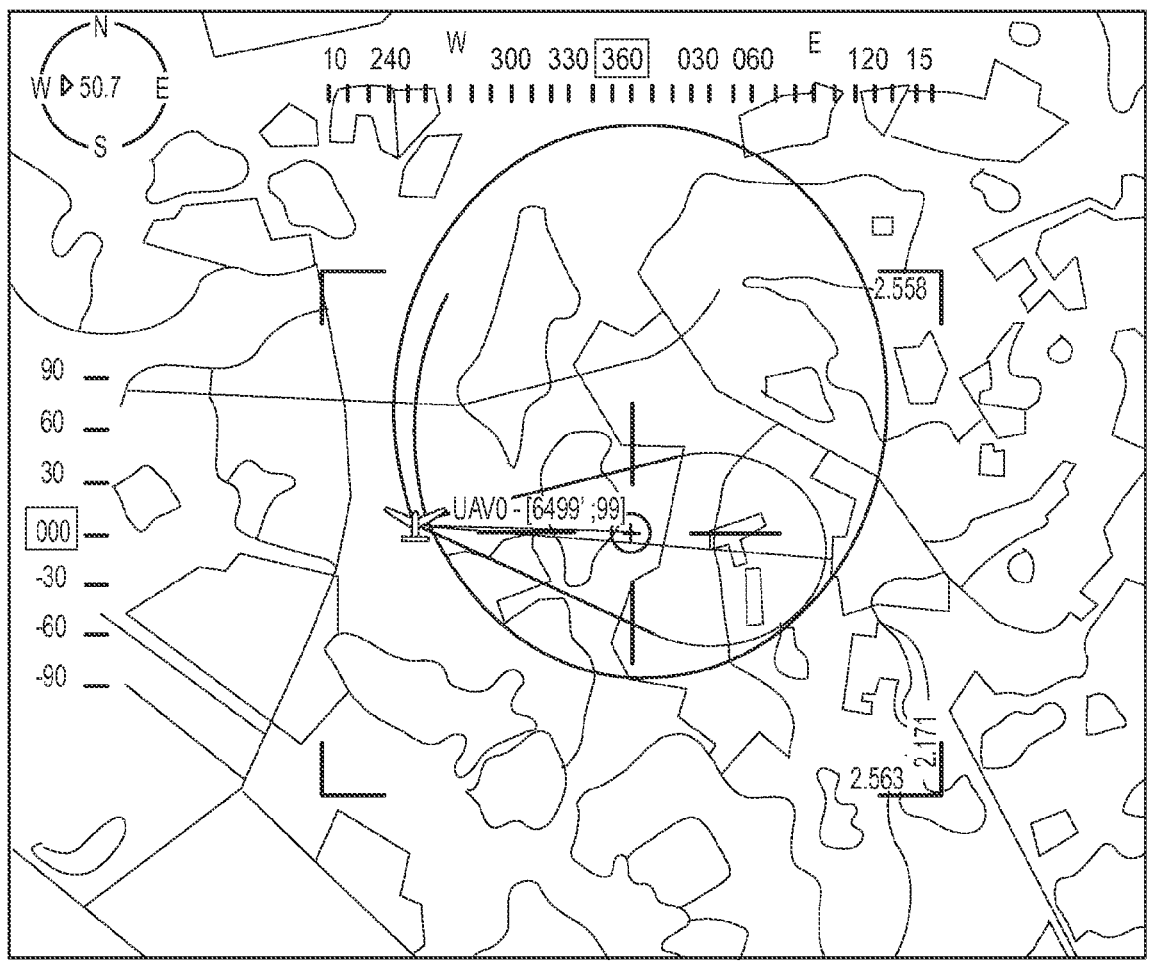
FIG. 16 shows an aircraft using a wide field of view, and fixed orientation, sensor during surveillance of a target.

In some embodiments, a control method adjusts the roll of the aircraft while orbiting the target so that the path of the aircraft will converge on the calculated optimal ellipse for the current estimated wind speed and direction. FIG. 16 illustrates the flight path of a simulated aircraft using such a control method to provide persistent surveillance imagery of a target in high wind conditions.

As shown in FIG. 16, the aircraft is flying at 6499 feet and with an EAS (equivalent air speed) of 99 knots which corresponds to a TAS of about 110 knots. The wind is simulated as coming from the West at 50.7 knots. The small circle with the cross denotes the target location. The curved line is a trail showing the path of the aircraft over the last orbit and the shaded area emanating from the aircraft icon shows the field of view of the sensor. As shown in FIG. 16, the sensor's view is perpendicular to the aircraft's heading and the heading is significantly different from the aircraft's course due to the high wind condition. The path does not return exactly to its previous orbit position because the simulated wind speed was changed from earlier in the simulation, as will be explained in more detail herein. After several orbits at a constant simulated wind speed, the path converges on an optimal ellipse.

Figure 17:
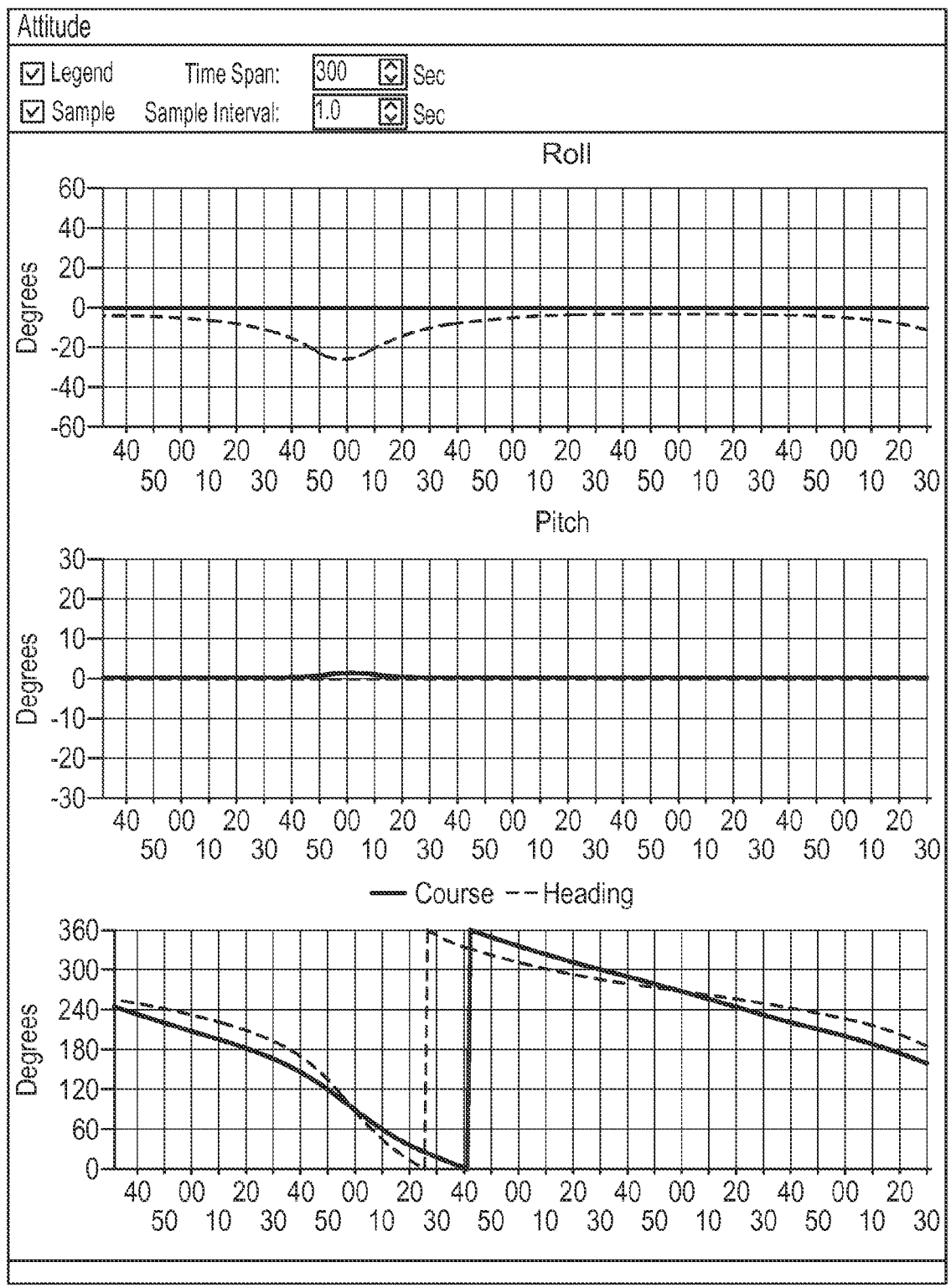
FIG. 17 is a graphical representation of a roll, a pitch and a course and heading of the aircraft illustrated in FIG. 16 during surveillance of the target.

FIG. 17 shows graphs of the attitude angles and the course of the aircraft over the previous 300 seconds. As shown in FIG. 17, there is a large variation in the roll angle that is required to keep the aircraft in its elliptical path, and the roll angle is larger at the point in the orbit where the aircraft is closer to the target (the desired behavior to keep the sensor pointed near the target). The course differs from the heading by as much as 30° at certain points in the orbit; if the aircraft were flying a circular path in which the course is always perpendicular to the target, then the heading would not be perpendicular and the sensor would not point at the target.

In some embodiments, the control method described herein is implemented via software on the aircraft. In some such embodiments, the control method assumes that there is a maximum roll angle that the control commands are not allowed to exceed and that there is an input optimal airspeed (EAS) that should be used and an input minimum and maximum altitude (AMSL—Above Mean Sea Level). Additionally, the control method can assume that the aircraft regularly reports its position, ground speed, air speed, and attitude angles to, for example, a control station such as control station 10 shown in FIG. 14, and that the current wind speed and direction can be estimated. The control method can be divided into two stages: approach and orbit.

The approach stage is initiated when the target is assigned or when the target's location changes. The system on the aircraft first determines the altitude to use when orbiting the target. When determining the optimal ellipse at a given TAS and altitude, there is a minimum altitude below which there is no solution and for altitudes above this value, the optimal ellipse at the current wind speed may require roll angles that are too large. Increasing the altitude will decrease the maximum roll needed in the optimal ellipse so the system determines a minimum acceptable altitude for which an optimal ellipse can be found which does not require too large a roll angle. The system then assigns an altitude for the orbit that is within the input allowed altitude range and as close as possible to this minimum acceptable altitude. The aircraft then flies a tangential course to the optimal orbit ellipse and to the selected altitude. As the aircraft approaches its orbit, the wind conditions may change and, as a result, the aircraft may have to adjust its altitude and orbit along the way.

When the aircraft reaches the orbit ellipse, it transitions to its 'orbit' control stage. The aircraft may not yet be at the desired altitude but it controls its roll angle in the same way as if it were at its desired altitude. The primary near term goal of the roll control in this stage is to keep the heading of the aircraft substantially perpendicular to the direction to the target. In some embodiments, the actual limits used to keep the aircraft "substantially perpendicular" would depend on the field of view of the camera. When the aircraft heading is not perpendicular, then the camera is not pointing at the target. In the camera's image, an aircraft heading deviation causes the target to move horizontally off center, a roll deviation causes the target to move vertically off center so the control method tries to keep both these deviations well within the field of view limits of the camera. If, for example, the camera field of view is +−20 degrees of its center, then the heading of the aircraft can be considered "substantially perpendicular" when the heading is between 80 and 100 degrees so that the target does not go more than ½ of the image off the center.

The roll angle can directly control the heading rate so one can define a 'first attempt' control equation for the roll which can cause the heading to quickly move towards and to stay perpendicular to the target. This roll can then be limited by the maximum aircraft roll angle and limited to be within an allowed range of the roll needed to have the sensor point at the target. If the aircraft is on the optimal ellipse and at an acceptable altitude, then these limits should not interfere with the heading control goal of the equation. If the wind speed is not changing, then the roll angles resulting from this control equation will be close to what is required to point the sensor at the target and the aircraft will stay on the ellipse and so the 'first attempt' control equation should work well.

In some embodiments, when the wind's speed and/or direction changes, the 'first attempt' control equation can push the aircraft into an ellipse that is smaller or larger than is required. In this instance, the process uses a modification to this control equation in order to move the aircraft's orbit closer to the optimal ellipse when that ellipse changes. Based on the current wind speed estimate and current aircraft state data, the process determines if the current ellipse being flown is smaller or larger than the current optimal ellipse. Then the process uses a control equation for the roll that differs from the 'first attempt' control equation in that it moves toward a heading that differs from the perpendicular to the target, where that angle difference depends linearly on the desired change in the ellipse size. But this angle difference will not be allowed to exceed an upper limit so that the sensor view direction stays within allowed limits of the target. A heading larger than perpendicular will make the aircraft tend to spiral towards the target, a heading smaller will make the aircraft tend to spiral away from the target. So in this way, the control equation causes the aircraft to slowly move toward the optimal ellipse for the current wind speed.

The aforementioned control methods and control equations can be stored in a memory, and executed by a processor, on the aircraft. The aircraft can include any of the components illustrated and described herein.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

It is understood that the foregoing description is that of the certain embodiments of the claimed inventions and that various changes and modifications may be made thereto without departing from the spirit and scope of the inventions as defined in the appended claims.

What is claimed is:

1. A non-transitory processor-readable medium storing code representing instructions to be executed by a processor, the code comprising code to cause the processor to:
   generate, at a first autonomous vehicle, a first planned path from at least a current position of the first autonomous vehicle to a destination, the first planned path being based, at least in part, on the current position of the first autonomous vehicle and a mission requirement assigned to the first autonomous vehicle to be performed at the destination;
   receive, at the first autonomous vehicle, from a second autonomous vehicle, a first planned path associated with the second autonomous vehicle, the first planned path associated with the second autonomous vehicle being from at least a current position of the second autonomous vehicle to the destination and being based, at least in part, on the current position of the second autonomous vehicle and a mission requirement assigned to the second autonomous vehicle to be performed at the destination;
   after the first planned path associated with the second autonomous vehicle is received, generate, at the first autonomous vehicle, a second planned path to the destination based, at least in part, on the first planned path associated with the second autonomous vehicle and the mission requirement assigned to the first autonomous vehicle;
   transmit the second planned path of the first autonomous vehicle from the first autonomous vehicle to the second autonomous vehicle; and
   receive, at the first autonomous vehicle, from the second autonomous vehicle, a second planned path associated with the second autonomous vehicle to the destination such that the first autonomous vehicle performs the mission requirement assigned to the first autonomous vehicle at the destination while the second autonomous vehicle performs the mission requirement assigned to the second autonomous vehicle at the destination, the second planned path associated with the second autonomous vehicle differing from the first planned path associated with the second autonomous vehicle.

2. The non-transitory processor-readable medium of claim 1, wherein the mission requirement assigned to the first autonomous vehicle is a first mission requirement, the code further comprising code to cause the processor to:
   receive, at the first autonomous vehicle, a second mission requirement assigned to the first autonomous vehicle to replace the first mission requirement; and
   generate, at the first autonomous vehicle, a third planned path based, at least in part, on the current position of the first autonomous vehicle and the second mission requirement.

3. The non-transitory processor-readable medium of claim 1, the code further comprising code to cause the processor to:
   determine, at the first autonomous vehicle, a future position of the first autonomous vehicle along the second planned path of the first autonomous vehicle; and
   when the future position of the first autonomous vehicle is within a predetermined distance of a future position of the second autonomous vehicle along the second planned path associated with the second autonomous vehicle during a future period of time, generate a third planned path for the first autonomous vehicle to avoid a close encounter with the second autonomous vehicle during the future period of time, the third planned path of the first autonomous vehicle not placing the first autonomous vehicle within the predetermined distance of the future position of the second autonomous vehicle at any point along the third planned path of the first autonomous vehicle.

4. The non-transitory processor-readable medium of claim 1, the code further comprising code to cause the processor to:
   receive, at the first autonomous vehicle, from a third autonomous vehicle, a planned path associated with the third autonomous vehicle,
   the code to generate the second planned path including code to generate the second planned path of the first autonomous vehicle based, at least in part, on the first planned path associated with the second autonomous vehicle, the planned path associated with the third autonomous vehicle, and at least one of the mission requirement assigned to the first autonomous vehicle or the first planned path of the first autonomous vehicle.

5. The non-transitory processor-readable medium of claim 1, the code further comprising code to cause the processor to:
   receive, at the first autonomous vehicle, from the second autonomous vehicle, a third planned path associated with the second autonomous vehicle when the second autonomous vehicle is unable to follow the second planned path due to at least one of an environmental factor or an equipment failure associated with the second autonomous vehicle;

generate, at the first autonomous vehicle, a third planned path based on the third planned path associated with the second autonomous vehicle and at least one of the mission requirement assigned to the first autonomous vehicle or the second planned path of the first autonomous vehicle; and transmit the third planned path from the first autonomous vehicle to the second autonomous vehicle.

6. The non-transitory processor-readable medium of claim 1, wherein the second planned path associated with the second autonomous vehicle differs from the first planned path associated with the second autonomous vehicle based, at least in part, on the second planned path for the first autonomous vehicle.

7. The non-transitory processor-readable medium of claim 1, wherein the second planned path of the first autonomous vehicle incorporates at least one of an evasive horizontal profile, a temporary altitude adjustment, or a temporary speed adjustment into the first planned path.

8. The non-transitory processor-readable medium of claim 1, wherein the code to generate the second planned path of the first autonomous vehicle avoids a projected collision with the second autonomous vehicle at a future location along the first planned path.

9. The non-transitory processor-readable medium of claim 1, wherein the mission requirement assigned to the first autonomous vehicle includes at least one of an instruction to orbit around a location of a target, an instruction to attack a target, an instruction to provide laser designation of a target, an instruction to taxi at an airfield, or an instruction to navigate to a designated location.

10. The non-transitory processor-readable medium of claim 1, the code further comprising code to cause the processor to:

retransmit data associated with the second planned path of the first autonomous vehicle to compensate for the possibility that the data associated with the second planned path of the first autonomous vehicle transmitted via the code to transmit the second planned path was not received by the second autonomous vehicle.

11. The non-transitory processor-readable medium of claim 1, the code further comprising code to cause the processor to:

control a movement of the first autonomous vehicle such that the first autonomous vehicle follows the first planned path, the code to control being autarchically performed by the first autonomous vehicle.

12. The non-transitory processor-readable medium of claim 1, wherein the mission requirement assigned to the second autonomous vehicle includes at least one of an instruction to provide jamming measures in a target area, an instruction to provide air support, an instruction to provide a communications link, an instruction to provide intelligence for one or more autonomous vehicles, an instruction to locate an object, an instruction to navigate to a designated location, or an instruction to monitor a target area.

13. The non-transitory processor-readable medium of claim 1, wherein the first autonomous vehicle is one of unmanned, optionally piloted, or robotic and one of an aerial vehicle, a surface vehicle, a space vehicle, or a sea vehicle.

14. The non-transitory processor-readable medium of claim 1, wherein the mission requirement assigned to the first autonomous vehicle is different from the mission requirement assigned to the second autonomous vehicle.

15. The non-transitory processor-readable medium of claim 1, wherein the first planned path of the first autonomous vehicle includes a sequence of smoothly connecting arc segments and line segments.

16. A non-transitory processor-readable medium storing code representing instructions to be executed by a processor, the code comprising code to cause the processor to:

generate, at a first autonomous vehicle, a planned path based, at least in part, on a mission requirement assigned to the first autonomous vehicle, the first autonomous vehicle having a first rank;

receive, at the first autonomous vehicle, from a second autonomous vehicle, a first planned path associated with the second autonomous vehicle based, at least in part, on a mission requirement assigned to the second autonomous vehicle, the second autonomous vehicle having a second rank, lower than the first rank, the mission requirement assigned to the second autonomous vehicle different from the mission requirement assigned to the first autonomous vehicle;

transmit the planned path of the first autonomous vehicle from the first autonomous vehicle to the second autonomous vehicle; and after the planned path of the first autonomous vehicle is transmitted, receive, at the first autonomous vehicle, from the second autonomous vehicle, a second planned path associated with the second autonomous vehicle, the second planned path associated with the second autonomous vehicle based, at least in part, on the planned path of the first autonomous vehicle, the mission requirement assigned to the second autonomous vehicle and the first rank.

17. The non-transitory processor-readable medium of claim 16, wherein the first autonomous vehicle operates cooperatively with the second autonomous vehicle so that the first autonomous vehicle performs the mission requirement assigned to the first autonomous vehicle and the second autonomous vehicle performs the mission requirement assigned to the second autonomous vehicle.

18. The non-transitory processor-readable medium of claim 16, wherein the code to generate the planned path of the first autonomous vehicle includes code to generate the planned path based, at least in part, on the mission requirement assigned to the first autonomous vehicle and the first rank.

19. The non-transitory processor-readable medium of claim 16, wherein the planned path of the first autonomous vehicle is a first planned path of the first autonomous vehicle, the code further comprising code to cause the processor to:

generate, at the first autonomous vehicle, a second planned path based, at least in part, on the mission requirement assigned to the first autonomous vehicle and the second planned path associated with the second autonomous vehicle.

20. The non-transitory processor-readable medium of claim 16, wherein the mission requirement assigned to the first autonomous vehicle is a first mission requirement, the planned path of the first autonomous vehicle is a first planned path, the code further comprising code to cause the processor to:

receive, at the first autonomous vehicle, a second mission requirement assigned to the first autonomous vehicle to replace the first mission requirement; and generate, at the first autonomous vehicle, a second planned path based, at least in part, on the second mission requirement and the first rank.

21. The non-transitory processor-readable medium of claim 16, wherein the planned path of the first autonomous vehicle is a first planned path, the code further comprising code to cause the processor to:

receive, at the first autonomous vehicle, from a third autonomous vehicle, a planned path associated with the third autonomous vehicle, the third autonomous vehicle having a third rank greater than the first rank;

generate, at the first autonomous vehicle, a second planned path based, at least in part, on the mission requirement assigned to the first autonomous vehicle and the planned path associated with the third autonomous vehicle; and after the second planned path is generated, transmit the second planned path of the first autonomous vehicle to the second autonomous vehicle and the third autonomous vehicle.

22. The non-transitory processor-readable medium of claim 16, wherein the planned path of the first autonomous vehicle is a first planned path, the code further comprising code to cause the processor to:

prevent the first autonomous vehicle from generating a second planned path based on the second planned path associated with the second autonomous vehicle because the first rank is greater than the second rank.

23. The non-transitory processor-readable medium of claim 16, wherein the mission requirement assigned to the first autonomous vehicle or the second autonomous vehicle includes at least one of an instruction to orbit around a location of a target, an instruction to attack a target, an instruction to provide laser designation of a target, an instruction to taxi at an airfield, or an instruction to navigate to a designated location.

24. The non-transitory processor-readable medium of claim 16, wherein the mission requirement assigned to the first autonomous vehicle or the second autonomous vehicle includes at least one of an instruction to provide jamming measures in a target area, an instruction to provide air support, an instruction to provide a communications link, an instruction to provide intelligence for one or more autonomous vehicles, an instruction to locate an object, an instruction to navigate to a designated location or an instruction to monitor a target area.

25. The non-transitory processor-readable medium of claim 16, wherein the first autonomous vehicle is one of unmanned, optionally piloted, or robotic and one of an aerial vehicle, a surface vehicle, a space vehicle, or a sea vehicle.

26. A non-transitory processor-readable medium storing code representing instructions to be executed by a processor, the code comprising code to cause the processor to:

generate, at a first autonomous vehicle, a first planned path based, at least in part, on a mission requirement assigned to the first autonomous vehicle, the first autonomous vehicle having an assigned first rank when the first planned path of the first autonomous vehicle is generated;

receive, at the first autonomous vehicle, from a second autonomous vehicle having an assigned second rank, a planned path associated with the second autonomous vehicle based, at least in part, on a mission requirement assigned to the second autonomous vehicle and the second rank, the assigned second rank being higher than the assigned first rank;

after the planned path associated with the second autonomous vehicle is received, generate, at the first autonomous vehicle, a second planned path based, at least in part, on the planned path associated with the second autonomous vehicle, the assigned first rank, and the mission requirement assigned to the first autonomous vehicle; and transmit the second planned path from the first autonomous vehicle to the second autonomous vehicle such that the first autonomous vehicle operates cooperatively with the second autonomous vehicle to perform the mission requirement assigned to the first autonomous vehicle.

27. The non-transitory processor-readable medium of claim 26, the code further comprising code to cause the processor to:

determine, at the first autonomous vehicle, a future position of the first autonomous vehicle along the second planned path of the first autonomous vehicle at a future period of time;

determine, at the first autonomous vehicle, a future position of the second autonomous vehicle along the planned path associated with the second autonomous vehicle at the future period of time;

when the future position of the first autonomous vehicle is within a predetermined distance of the future position of the second autonomous vehicle during the future period of time, generate a third planned path for the first autonomous vehicle to avoid a close encounter with the second autonomous vehicle during the future period of time, the third planned path not placing the first autonomous vehicle within the predetermined distance of the future position of the second autonomous vehicle at any point along the third planned path of the first autonomous vehicle; and after the third planned path is generated, transmit the third planned path of the first autonomous vehicle from the first autonomous vehicle to the second autonomous vehicle.

28. The non-transitory processor-readable medium of claim 26, wherein the second planned path of the first autonomous vehicle incorporates at least one of a velocity adjustment, an altitude adjustment, or a horizontal profile adjustment into the first planned path of the first autonomous vehicle.

29. The non-transitory processor-readable medium of claim 26, the code further comprising code to cause the processor to:

after the planned path associated with the second autonomous vehicle is received, determine, at the first autonomous vehicle, a future position of the second autonomous vehicle along the planned path associated with the second autonomous vehicle;

when the future position of the second autonomous vehicle is within a predetermined distance of a future position of the first autonomous vehicle during a future period of time, generate a third planned path for the first autonomous vehicle to avoid a close encounter with the second autonomous vehicle during the future period of time, the third planned path not placing the first autonomous vehicle within the predetermined distance of the future position of the second autonomous vehicle at any point along the third planned path of the first autonomous vehicle; and after the third planned path is generated, transmit the third planned path of the first autonomous vehicle from the first autonomous vehicle to the second autonomous vehicle.

30. The non-transitory processor-readable medium of claim 26, the code further comprising code to cause the processor to:

receive, at the first autonomous vehicle, from a third autonomous vehicle, a planned path associated with the third autonomous vehicle, the third autonomous vehicle having an assigned third rank greater than the assigned first rank;
generate, at the first autonomous vehicle, a third planned path based, at least in part, on the planned path associated with the third autonomous vehicle and at least one of the mission requirement assigned to the first autonomous vehicle or the second planned path; and
after the third planned path is generated, transmit the third planned path to the second autonomous vehicle and the third autonomous vehicle.

* * * * *